Patented Oct. 29, 1935

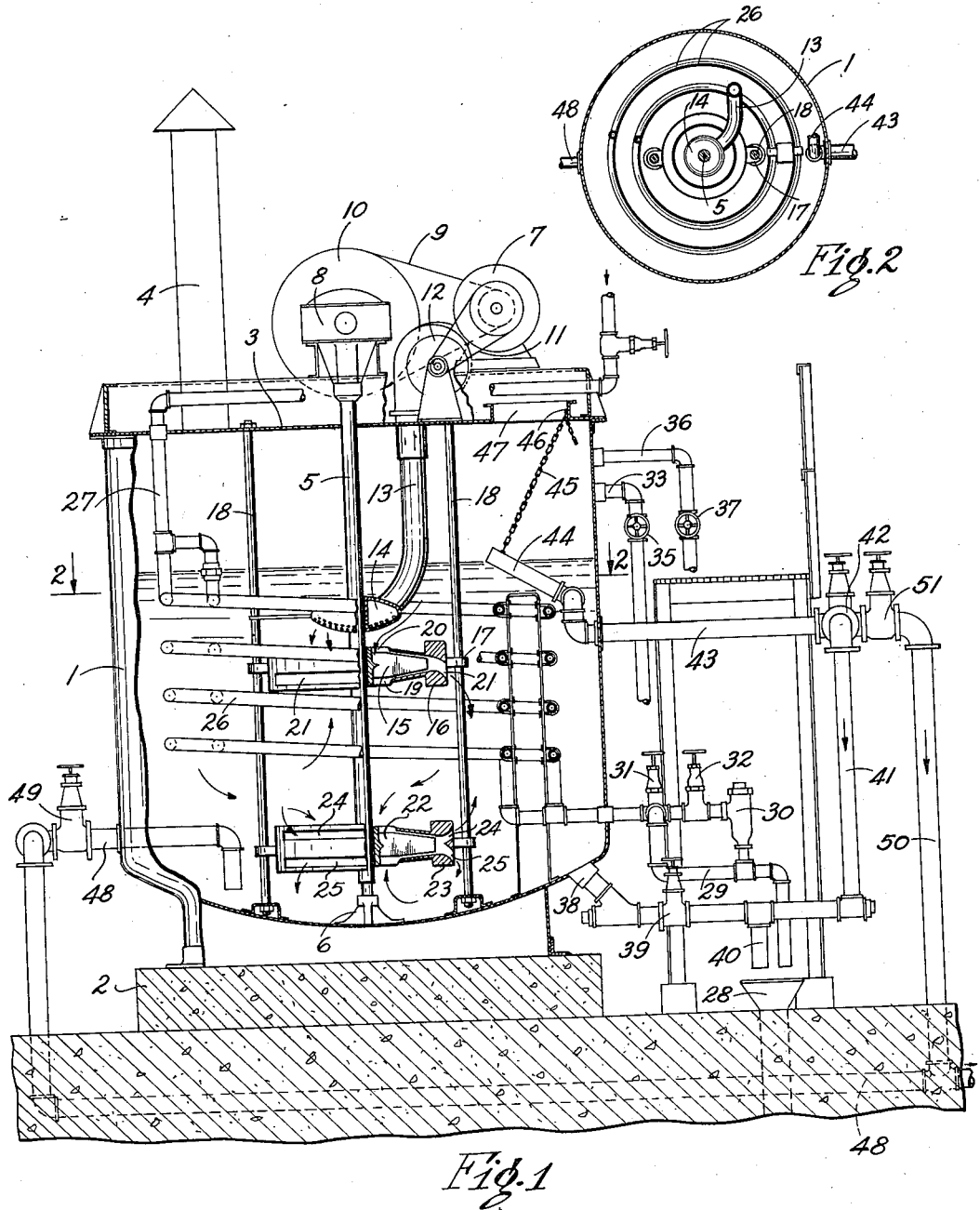

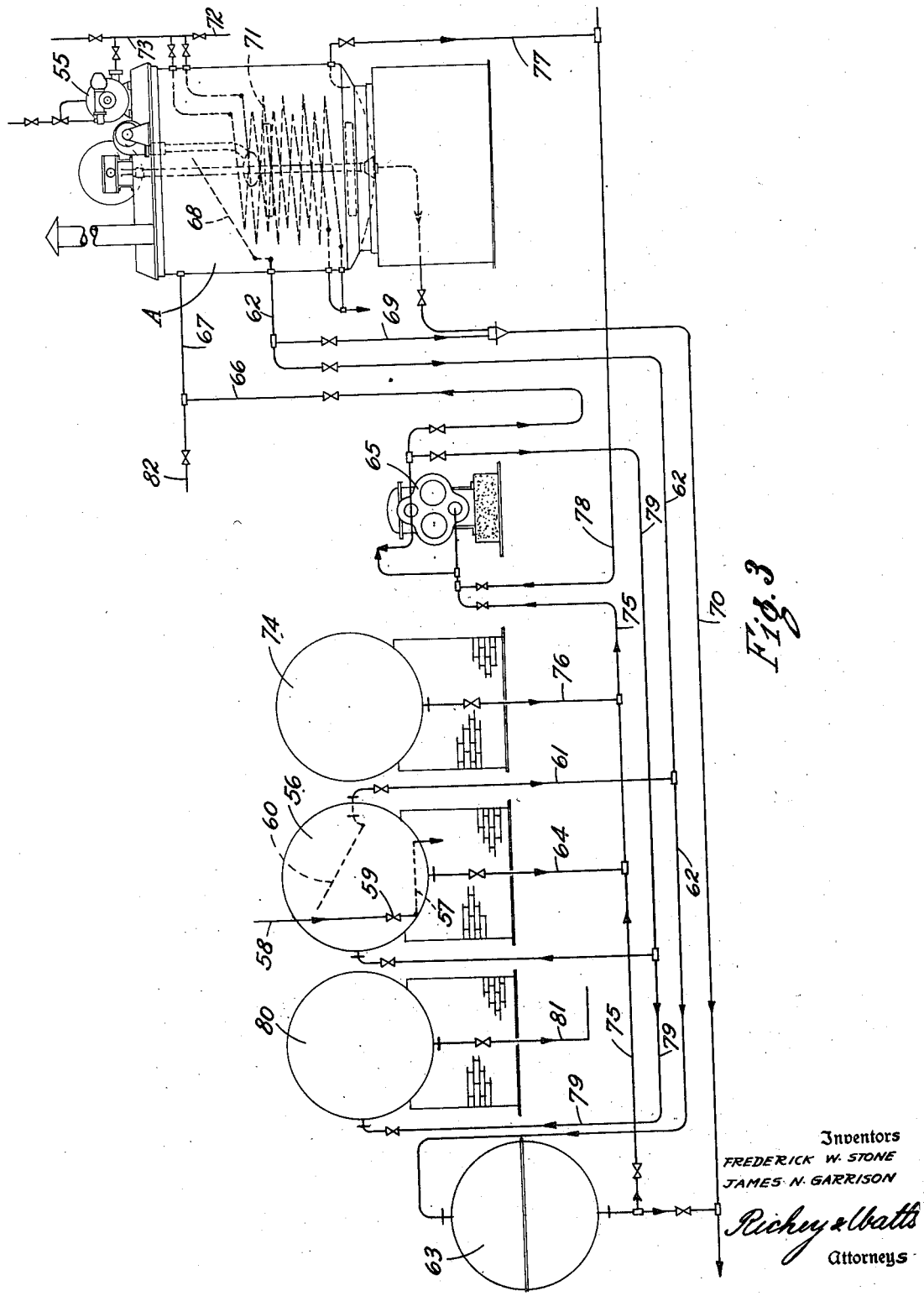

2,019,325

UNITED STATES PATENT OFFICE 2,019,325

APPARATUS FOR MIXING FLUIDS

Frederick W. Stone and James N. Garrison, Cleveland, Ohio

Application January 5, 1933, Serial No. 650,292

4 Claims. (Cl. 261—93)

This invention relates to apparatus for agitating and intimately mixing fluids and is particularly adapted for mixing a liquid and a gas. More particularly our invention relates to an improved apparatus for regenerating spent sodium plumbite or "doctor" solution.

In industrial processes it is frequently desired to intimately mix two fluids. The present invention is adaptable to many different applications but this description of our invention will be confined to the use of our apparatus in the regeneration of the sodium plumbite solution used in petroleum oil refining, and particularly the gasoline manufacturing process.

Sodium plumbite solution is principally used for chemically treating or sweetening petroleum products, principally gasoline and kerosene. The sodium plumbite ($Na_2PbO_2$) converts certain disagreeable smelling sulphur compounds and mercaptans to other compounds which are not disagreeable and also removes some of the sulphur compounds. The sodium plumbite solution used in the industry is commonly referred to as "doctor solution" and consists principally of a solution of lead oxide, caustic soda and water in varying proportions according to the result desired.

In the process of sweetening petroleum products it is usually necessary to add elementary sulphur and this, together with the sulphur in the petroleum products, converts most of the lead in the sodium plumbite into lead sulphide. The spent "doctor" solution which results after the conversion of the sulphur is a black sludge consisting principally of oil, lead sulphide, caustic soda and sodium sulphide. Because of the difficulties which have been experienced in reclaiming the spent doctor solution the usual practice has been to remove it as a waste product. This results in a serious economic loss and is also frequently a nuisance as the lead sulphide contaminates any streams or bodies of water into which the waste doctor solution may be discharged. It has been proposed to reclaim and revivify the spent doctor solution by blowing compressed air through the solution. Without going into the details of the chemical reaction involved it may be stated that this aeration of the spent solution results in a conversion of the lead sulphide and caustic soda into sodium plumbite and water in substantially the same form as the solution before the reaction with the sulphur in the oil.

Attempts to regenerate the solution in this manner, with which we are familiar, have not been successful due to the excessive power required to cause a sufficient quantity of air to mix with the spent solution and to inefficiencies in the procedure followed.

It is among the objects of our invention therefore to provide an improved apparatus for intimately mixing a gas with a liquid and particularly for mixing air with spent "doctor" solution. Another object of our invention is the provision of apparatus for intimately mixing gas and liquid which requires a minimum expenditure of power to accomplish the desired results.

The above and other objects of our invention will appear from the following description of our improved apparatus and the method for which it is particularly adapted, reference being had to the accompanying drawings, in which—

Figure 1 is a side elevation partly in section of our improved mixing apparatus.

Figure 2 is a cross section, on a reduced scale, taken on line 2—2 of Figure 1.

Figure 3 is a diagrammatic side elevation of apparatus adapted to carry out our improved method of regenerating sodium plumbite.

In the drawings (Figures 1 and 2) the tank 1 is suitably mounted on a base or foundation 2 and is provided with a top cover plate 3. The chimney 4 serves to carry away vapors which may arise from the liquid being treated in the tank. A vertical shaft 5 is centrally disposed in the tank 1 and may have a bearing at its lower end in the bracket 6. The upper end of the shaft 5 is connected to the driving motor or other prime mover 7 through the gear box 8, which in the illustration shown is adapted to transmit power at right angles, and the belt or chain 9 which connects the pulley or sprocket 10 to the motor 7. A second belt or chain 11 is adapted to drive the blower fan 12 from the motor 7. This fan 12 may be of any suitable type and takes air from the atmosphere and causes it to flow at relatively low pressure, downwardly through a pipe 13 into the tank 1. The lower end of the pipe 13, as shown, comprises an annular outlet member 14 which is provided with a plurality of holes on its lower side. The drive shaft 5 passes through the central opening in the annular outlet 14.

An impeller unit 15 is secured to the shaft 5 immediately below the outlet member 14. This impeller 15 preferably includes a plurality of radially extending blades mounted on a hub and is, of course, rotatable with the shaft 5. The housing 16 for the impeller 15 is supported by lugs 17 which are clamped on or otherwise suitably attached to the vertically extending rods 18. The housing 16 is provided with annular top and bottom inlet openings 19 and 20 and with a slot-like circumferentially extending outlet opening 21. As seen in Figure 1 this outlet opening 21 is adapted to discharge fluid in a downwardly direction as indicated by the arrows on the drawings.

Another agitating impeller 22 is mounted on the shaft 5 below the impeller 15. This impeller 22 is substantially the same as impeller 15 but the empeller housing 23 is provided with split circumferentially extending outlet slots 24 and 25 and it will be seen that fluid which is drawn in through the inlet openings by the rotation of the impeller 22 will be divided and part directed upwardly through the outlet slot 24 and part downwardly through the outlet slot 25. The impellers 15 and 22 are preferably vertically adjustable on the shaft 5 and the housings 23 and 16 may also be moved vertically on the rods 18. Thus, the agitating units may be spaced to give the most effective operation and it will be understood by those skilled in the art that any desired number of agitating units may be mounted on the shaft 5 as deemed necessary or desirable.

In order to maintain the liquid being treated at the proper temperature we have provided a pipe coil 26. Steam may be admitted to this coil through the pipe 27 and discharged either directly into the sewer connection 28 through the pipe 29 or by-passed into the sewer through the steam trap 30 by means of proper manipulation of the control valves 31 and 32.

The liquid to be treated (spent doctor solution) is conveyed to the tank 1 through the pipe 33 and a valve 35 is interposed in the pipe to control the flow therethrough. Another inlet pipe 36, having a valve 37, may be provided to supply water to the tank 1 to maintain the proper concentration of the solution.

A bottom outlet 38 controlled by a valve 39 is adapted to discharge the contents of the tank 1 into the sewer 28 through pipe 40. The pipe 40 is also connected through pipe 41, valve 42 and pipe 43 to the pivoted skimmer pipe 44. This pipe 44 may be secured in the desired position by means of a chain 45 which engages a suitable hook 46 on the side of the hand hole 37 in the cover plate 3. The function of the skimmer pipe 44 will be later explained.

The regenerated doctor solution may be withdrawn from the tank 1 through the pipe 48 which extends into the tank 1 and has an inlet opening adjacent the bottom of the tank. The pipe 48 may be connected to a suitable pump or other means for withdrawing the liquid and the flow through the pipe can be controlled by the valve 49.

If desired the liquid which is skimmed off by the skimmer pipe 44 may be conducted to the pipe 48 through pipe 50 instead of discharging it into the sewer through the pipes 41 and 40. By proper manipulation of the valves 42 and 51 the disposal of the skimmed liquid may be controlled.

In Figure 3 we have diagrammatically illustrated a layout of apparatus adapted to carry out our improved method of regenerating sodium plumbite. In this layout the agitating unit which is generally indicated at A, is substantially the same as that illustrated in Figures 1 and 2 and described above. It should be noted, however, that the unit A is driven by a steam turbine 55, as distinguished from the electric motor 7, shown in Figure 1 and the piping arrangements are not exactly the same. These differences will become evident from the following description of Figure 3.

The spent doctor solution, after it has been used to sweeten the oil, is discharged into the storage tank 56 and may be kept at the desired temperature therein by the steam coil 57 which may be supplied with steam from the pipe 58 under the control of valve 59. A pivoted skimmer pipe 60 is disposed within the tank 56 and is adapted to skim off any oil which may rise to the surface of the spent solution during its stay in the tank 56. This oil may be conducted through the pipes 61 and 62 to the wash oil tank 63. The spent solution is withdrawn from the bottom of tank 56 through the pipe 64 by the transfer pump 65. This pump 65 is adapted to force the spent solution through pipes 66 and 67 into the agitating unit A. The skimmer pipe 68 of unit A is preferably pivoted so that the proper quantity may be removed and the skimmed oil is conveyed to the tank 63 by gravity through the pipe 62. An oil by-pass pipe 69 is provided so that, if desired, the oil may be discharged into the sewer through pipe 70. The heating coils 71 of the unit A are supplied with steam through pipe 72 from a suitable source of supply and are also adapted to utilize exhaust steam from the turbine 55 which is connected to the coil 71 through pipe 73.

The pump 65 is connected to the caustic tank 74 through the pipes 75 and 76 and is adapted to withdraw caustic solution (NaOH) from the tank 74 and discharge it into the agitator A through pipes 66 and 67 for purposes which are fully described later. After the regenerating process has been completed in the unit A the regenerated doctor solution is withdrawn from the lower part thereof through the pipe 77. The pump 65 is suitably connected to the pipe 77 through the pipe 78 and is adapted to withdraw the regenerated solution and discharge it through pipe 79 into the regenerated doctor solution storage tank 80. The tank 80 is provided with a bottom outlet pipe 81 which conducts the solution to the treater where the oil is sweetened. In the layout above described it will be understood that valves are disposed wherever necessary to properly control the operation of the apparatus and are conventionally illustrated in the drawings. A single transfer pump 65 is so connected that it may be utilized to discharge the various fluids into the unit A and to withdraw the regenerated solution therefrom. Thus, by properly manipulating the control valves the pump can be connected to withdraw fluid from any one of the tanks 56, 63, 74, and 80 through the pipe 75 and discharge the liquid into the tank of the regenerating unit A through the pipes 65 and 67. Water may be discharged into the unit A through the pipes 82 and 67.

Our improved method of regenerating the spent doctor solution will now be described, reference being had to the apparatus illustrated in Figure 3.

The spent doctor solution, which always contains a certain amount of the oil which has been treated, is collected in the tank 56. While the solution remains in the tank 56 some of the oil may rise to the surface thereof and be skimmed off through the pipe 60 and carried by gravity to the oil tank 63. To start the operation, a charge of spent solution is withdrawn from the tank 56 and discharged into the tank of unit A. As noted above a portion of the oil which is contained in the spent solution may be separated out by simply heating the solution and allowing the lead sulphide to settle and the oil to rise to the surface where it may be removed by skimming. However, a certain portion of the oil is combined with the sodium hydroxide and the lead sulphide in the form of emulsion which will not break up by simple settling and heating. Therefore, in our improved process we heat the solution in the tank of the unit A to the proper temperature, approximately 150° F., and by rotating the impellers of the unit A relatively slowly, we are able to break up the emulsion above noted and coagulate the small particles of oil so that they can rise to the surface and be withdrawn by skimming. As it is necessary that all oil be removed from the solution before successful oxidization of the lead sulphide can take place, this step of our process is important. The regenerator unit A provides a means for controlled agitation and heating by which the emulsion of the oil with the sodium hydroxide and lead sulphide may be broken and oil free lead sulphide be precipitated. If necessary, additional elementary sulphur may be added to the solution during the precipitation stage to aid in the precipitation. After the oil has completely separated out, by the combined normal separation into strata and the breaking down of the emulsion and coagulation of the oil particles, as above noted, it is skimmed off by the pipe 68 and collected in the wash oil tank 63. The heating operation may now be continued until the solution reaches a temperature of approximately 175° F. (this temperature, however, is subject to rather wide variation). Provisions are made for adding fresh sodium hydroxide (NaOH) solution to the regenerator unit A so that sodium plumbite may be formed as rapidly as the lead sulphide is oxidized to lead sulphate or lead oxide.

Next the motor or steam turbine 7 or 55 is started driving the impellers 15 and 22 and the blower fan 12. The rotation of the impeller 15 causes the liquid to be drawn in through the inlet openings 19 and 20 and discharged downwardly through the circumferential slot 21. Air is blown into the liquid through the pipe 13 and the annular outlet head 14 and, as the holes in the head 14 are immediately adjacent the inlet opening 20, a large part of the air will be drawn down into the impeller 15 and caused to be intimately mixed with the liquid and discharged outwardly through the slot 21 and carried down into the tank with the liquid as indicated by the arrows. This downwardly moving body of mixed liquid and air is picked up by the impeller 22 and is again intimately mixed and agitated and thrown out through the outlet openings 24 and 25. The mixture which is discharged from the outlet 25 moves downwardly toward the bottom of the tank, and will, to a considerable extent, swirl around and be drawn back into the bottom inlet opening to the impeller 22. By providing a dual arrangement of impellers together with the air inlet which is adapted to supply the air directly into the inlet of one of the impellers, an extremely thorough and complete mixture and agitation of the liquid with the air is effected. The air is retained in the solution for a relatively long period of time with the result that very efficient oxidization is accomplished.

In the operation of our apparatus we have found that 90 to 95% of lead sulphide may easily be converted into sodium plumbite in a period of eight to ten hours. After the regeneration is completed the tank contains a clear sodium plumbite or "doctor" solution which is ready for use and equal in its effectiveness to fresh doctor solution.

Frequently the regenerated doctor solution contains oil soluble impurities which, if permitted to remain in the solution, would discolor oil being treated thereby. These impurities can be removed by washing the solution with oil. As the oil which is skimmed from the spent doctor solution in the unit A is accumulated in the tank 63, and as this oil has already been sweetened, it is available for washing the regenerated doctor solution. Therefore, if it is necessary to wash the regenerated doctor solution, a portion of the skimmed oil is pumped to the regenerating unit A from the tank 63 through the pipes 66 and 67, after the regeneration reaction is finished, and is agitated together with the regenerated doctor solution. After the washing action is completed the agitating impellers are stopped and the oil allowed to rise to the surface from whence it is skimmed and either carried to the refinery to be redistilled or discharged to waste. The above described oil washing of the regenerated doctor solution removes colored impurities and free sulphur and leaves the regenerated doctor solution equal to fresh doctor solution.

The air pressure necessary to draw the air into the liquid need be very small and the power required by the blower fan 12 is negligible. In some cases the blower 12 may be omitted entirely as sufficient air will be drawn into the liquid through the pipe 15 from the atmosphere due to the suction of the impeller 13 which is effective at the inlet opening 20.

Although we have illustrated a particular embodiment of our apparatus and described it in connection with a process for regenerating sodium plumbite, it will be understood that our apparatus is readily adaptable to many other uses where it is desired to intimately and thoroughly mix fluids with a minimum of expenditure of power. We do not, therefore, limit ourselves to the specific apparatus shown and specific steps of method described as our invention, but claim as our invention all embodiments thereof coming within the scope of the appended claims.

What we claim is:

1. In apparatus for mixing a liquid and a gas, a tank, means for conducting liquid to said tank, means for withdrawing liquid from said tank, a plurality of agitating units in said tank arranged in superimposed relation, each of said units including an impeller and a housing therefor, each housing being provided with inlet and outlet openings, said outlet openings being adapted to direct fluid toward the next lower agitating unit, means for rotating said impellers and means for conducting a gas into said tank and discharging same at a point adjacent the inlet opening of the housing of the upper agitating unit.

2. Apparatus for regenerating spent "doctor" solution including in combination, a tank, means for conducting spent solution to said tank, means for withdrawing regenerated solution, an adjustable skimmer pipe and means for conducting skimmed fluid to a place of disposal, means for conducting air into the solution in said tank and mechanical agitating means for intimately mixing said air with the solution.

3. Apparatus for regenerating spent "doctor" solution including in combination, a tank, means for conducting spent solution to said tank, means for withdrawing regenerated solution from said tank, adjustable skimmer means, means for conducting skimmed fluid to a place of disposal, an air conducting conduit extending into said tank and having a downwardly directed outlet opening within said tank, and an agitating unit including a rotatable impeller and a housing therefor having a central inlet and peripheral outlet, said housing being disposed in said tank with the inlet opening adjacent the outlet opening of said air conduit.

4. Apparatus for regenerating spent "doctor" solution including in combination, a tank, means for conducting spent solution to said tank, means for withdrawing regenerated solution from said tank, adjustable skimmer means, means for conducting skimmed fluid to a place of disposal, an air conducting conduit extending into said tank and having a downwardly directed outlet opening within said tank, an agitating unit including a rotatable impeller and a housing therefor having a central inlet and peripheral outlet, said housing being disposed in said tank with the inlet opening adjacent the outlet opening of said air conduit, and means for forcing air through said air conducting conduit into said tank.

FREDERICK W. STONE.
JAMES N. GARRISON.